(12) United States Patent
    Hart et al.

(10) Patent No.: US 11,570,155 B2
(45) Date of Patent: Jan. 31, 2023

(54) ENHANCED SECURE ENCRYPTION AND DECRYPTION SYSTEM

(71) Applicant: Vengar Technologies, LLC, San Antonio, TX (US)

(72) Inventors: Brandon Hart, Irving, TX (US); Courtney Roach, Savannah, TX (US)

(73) Assignee: Everything Blockchain Technology Corp., Jacksonville, FL (US)

( * ) Notice: Subject to any disclaimer, the term of this patent is extended or adjusted under 35 U.S.C. 154(b) by 224 days.

(21) Appl. No.: 16/935,941

(22) Filed: Jul. 22, 2020

(65) Prior Publication Data

US 2021/0029096 A1    Jan. 28, 2021

Related U.S. Application Data

(60) Provisional application No. 62/878,637, filed on Jul. 25, 2019.

(51) Int. Cl.
    *H04L 9/40*    (2022.01)
    *H04L 9/30*    (2006.01)
    *H04L 9/06*    (2006.01)
    *H04L 9/08*    (2006.01)

(52) U.S. Cl.
    CPC ........ *H04L 63/0435* (2013.01); *H04L 9/0631* (2013.01); *H04L 9/0869* (2013.01); *H04L 9/30* (2013.01)

(58) Field of Classification Search
    None
    See application file for complete search history.

(56) References Cited

U.S. PATENT DOCUMENTS

| 6,381,696 | B1  |   | 4/2002  | Doyle |
| 10,298,554 | B2 |   | 5/2019  | Pollet et al. |
| 10,924,482 | B1 | * | 2/2021  | Roth ........................ H04L 63/10 |
| 11,128,452 | B2 | * | 9/2021  | Vaněk ................... H04L 9/3066 |
| 2005/0244001 | A1 | * | 11/2005 | Kitani .............. G11B 20/00528 380/201 |

(Continued)

OTHER PUBLICATIONS

"ProofMarkTM System Technical Overview"; white paper; Rev. Jul. 2007; Proofspace, 900 Clancy Ave NE, Grand Rapids, MI. 49503; United States; 19 pages.

(Continued)

*Primary Examiner* — Bassam A Noaman
(74) *Attorney, Agent, or Firm* — Polansky & Associates, P.L.L.C.; Paul J. Polansky (57) ABSTRACT

Methods are described for a data creator to securely send a data payload to another device in a transient symmetric key technology (TSKT) system, and for the other device to securely receive the payload data. One method includes receiving a first seed and a formula from a command and control server. A second seed is generated, and the first seed and the second seed are combined using the formula to create a data seed. A first key is generated using the first seed, and the second seed is encrypted using the first key to form an encrypted second seed. A second key is generated using the data seed, and the data payload is encrypted using the second key to form an encrypted data payload. The encrypted data payload and the encrypted second seed are combined in a secure container, and subsequently all keys and seeds and the formula are destroyed.

27 Claims, 10 Drawing Sheets

(56) References Cited

U.S. PATENT DOCUMENTS

| | | | |
|---|---|---|---|
| 2006/0224793 A1* | 10/2006 | Purlia | G06F 16/185 |
| 2010/0150351 A1 | 6/2010 | Sutton, II et al. | |
| 2012/0250863 A1* | 10/2012 | Bukshpun | H04L 9/065 |
| | | | 380/278 |
| 2013/0013931 A1 | 1/2013 | O'Hare et al. | |
| 2014/0351586 A1 | 11/2014 | Hook et al. | |
| 2015/0117640 A1* | 4/2015 | Park | H04L 9/0869 |
| | | | 380/44 |
| 2016/0267280 A1* | 9/2016 | Mansour | G06F 21/445 |
| 2017/0033934 A1* | 2/2017 | Camenisch | H04L 9/3263 |
| 2017/0054555 A1* | 2/2017 | Yuan | H04L 63/061 |
| 2017/0244687 A1 | 8/2017 | Moulds et al. | |
| 2017/0264599 A1* | 9/2017 | O'Regan | H04W 12/068 |
| 2019/0392153 A1* | 12/2019 | Le Gargean | G06F 3/0623 |
| 2020/0004970 A1* | 1/2020 | Wang | H04L 9/3268 |
| 2020/0059703 A1* | 2/2020 | Sonare | H04N 21/42201 |
| 2020/0272580 A1* | 8/2020 | Lu | G06F 12/1408 |
| 2020/0358712 A1* | 11/2020 | Kurian | H04L 47/365 |
| 2021/0281408 A1* | 9/2021 | Liu | H04W 12/04 |

OTHER PUBLICATIONS

International Search Report and Written Opinion for International Application No. PCT/US2020/043283, dated Oct. 26, 2020, 7 pages.

* cited by examiner

ENHANCED SECURE ENCRYPTION AND DECRYPTION SYSTEM

FIELD

This disclosure relates generally to data security, and more specifically to methods and systems for exchanging and maintaining data with high levels of security.

BACKGROUND

Recently, reports of data breaches and compromises, thefts, or "hacks" of sensitive user information have become commonplace. Most of the vulnerabilities arise from exchange of user data over public networks, granting remote access to users whose security credentials or passwords can be guessed or automatically emulated, and storage and retrieval of data on systems that can be compromised. The industry has developed methods and algorithms for storing and transmitting data in encrypted format, such as the Advanced Encryption Standard (AES), which defines different block and key sizes and that provide higher levels of complexity for larger block and key sizes. A common AES standard, known as "AES-128", can theoretically be discovered or hacked, although with a great amount of difficulty. While AES standards with higher computational complexity have been developed, many systems use legacy AES-128 encryption or even simpler encryption and are still vulnerable to attack.

A typical system using a public key encryption (PKI) algorithm uses public key/private key encryption, in which the public key is generally available and used to encrypt data, but the private key is kept confidential and can decrypt the data. Because the private key is stored on one or more devices, if the computer itself is breached or hacked and the private key is discovered, the computational complexity of deciphering PKI-encrypted data can be bypassed, and sensitive user data can be exposed.

In the PKI system, an entity known as a certificate authority (CA) has the ability to issue private keys to allow trusted users to gain access to data. However, the CAs themselves have been breached, hacked, or stolen from, leading to counterfeit certificates being issued and user's data being stolen.

In the following description, the use of the same reference numerals in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION OF ILLUSTRATIVE EMBODIMENTS

Encryption and/or decryption according to the techniques described herein vastly improve known public key/private key systems by making encryption and decryption keys transitory on the user's system, such that they are only in existence for a period of time too short to expose the keys with any significant risk of hacking. The system is symmetric in that the same process is used for both encrypting and decrypting. The system defines a secure "container" for data that practically cannot be hacked.

In general, the inventors have created a transient, symmetric key method that allows for keys to be generated on demand and be present only for short periods of time while needed for encryption and decryption. The approach utilizes a distributed, zero-trust, end-to-end encryption architecture which leverages a new transient symmetric key technology (TSKT). After the keys are no longer needed, they are digitally destroyed by overwriting the values.

There will normally be three unique participants in the enhanced key management process: a data creator, a data accessor, and a command and control server. The data creator creates and encrypts the data. The data accessor has access rights to the encrypted data. The command and control server authenticates, validates and authorizes all creators' and accessors' rights to encrypted data.

Moreover, there are two types of keys that can be used to encrypt data: asymmetric and symmetric. Asymmetric cryptography, also known as Public-Key Infrastructure (PKI), uses a pair of keys (public and private) to encrypt and decrypt data. Traditionally, a network user receives a public and private key pair from a certificate authority. Any other user who wants to send an encrypted message can get the intended recipient's public key directly from the recipient or from a public directory. They use this key to encrypt the data, and they send it to the recipient. When the recipient gets the message, they decrypt it with their private key, which no one else should have access to.

However, this is not the case for the distributed, zero-trust, end-to-end encryption architecture described herein. In the architecture described herein, certificate authorities are unnecessary. Furthermore, the TSKT eliminates the need for a server to use, store, and manage public/private keys for users. The client machines generate their own public/private keys locally as needed. The public key is sent to the server by the local client when making a request to create a secure container or access an existing secure container. That public key is not stored on the server.

Known symmetric cryptography utilizes only one key to encrypt and decrypt data. While symmetric-key systems are generally more simple and faster, their main drawback is that the two parties attempting to communicate must somehow exchange the key in a secure way. This is where the TSKT comes into play, and the TSKT steps are described below. A TKST system according to some embodiments will now be described with a concrete example.

Exemplary Tskt Flows

Figure 1:
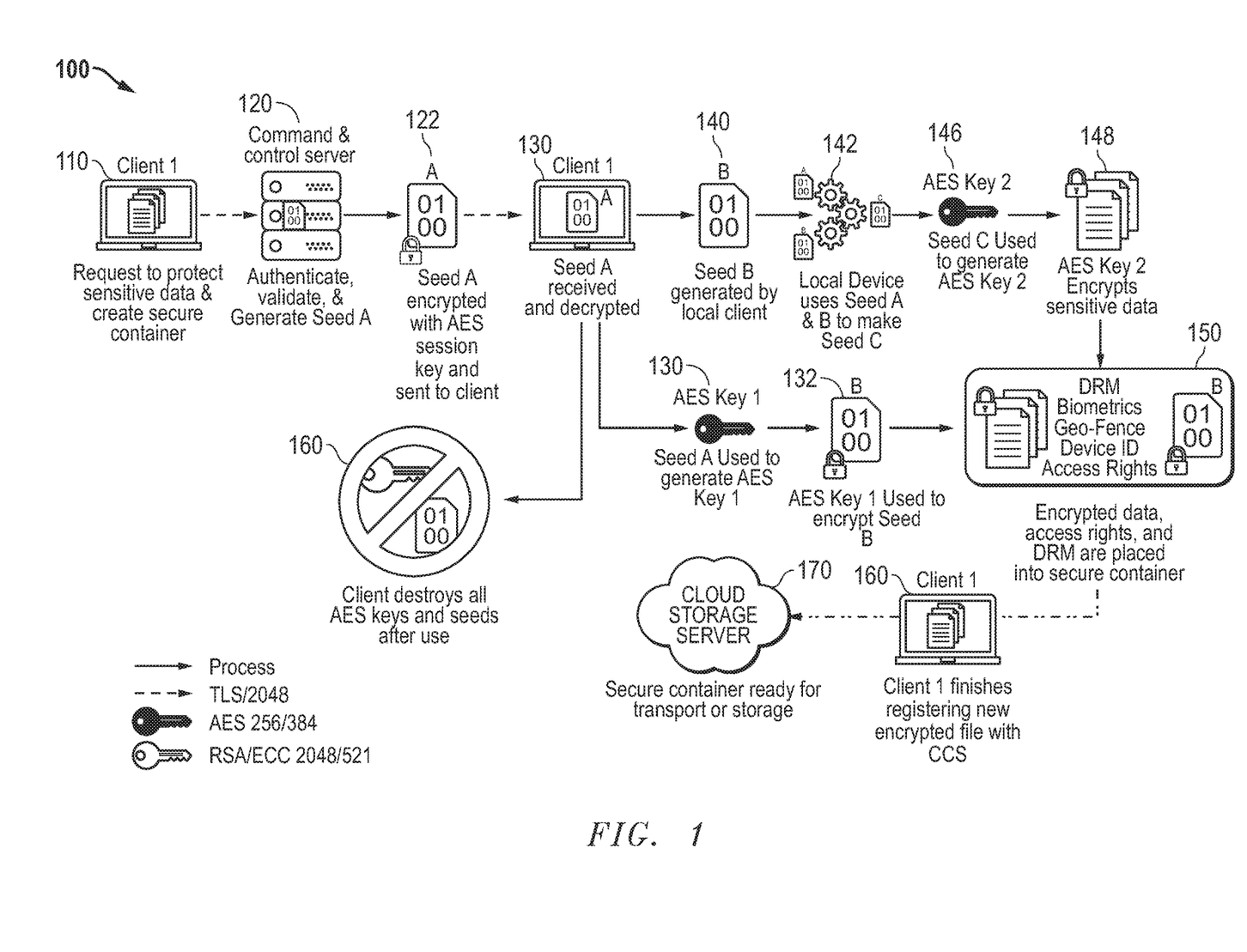
FIG. 1 illustrates a flow diagram that may be used by a data creator according to the embodiments herein.

FIG. 1 shows a flow diagram 100 that may be used by a data creator according to the embodiments herein. In the example shown in FIG. 1, the dashed lines indicate the flow of data over a link using a TLS based protocol. The solid lines represent a processing step that takes place inside a particular node. The black keys are keys encoded using AES. The gray keys are keys encoded using RSA or ECC. In other embodiments, other link protocols and key encryption and decryption standards can be used as well. Using the TKST method, the data creator/protector performs the following steps:

Data Creator/Protector

1. Creator (e.g. Client 1 in FIG. 1) has credentials, and generates public and private keys (RSA or ECC);
2. Creator requests permission from a Command & Control Server (CCS) (hereinafter "Server") to create a secure container;
3. Server authenticates and validates the request;
4. Server generates Seed A via a Pseudo Random Number Generator (PRNG), and Server generates a randomly unique formula;
5. Server encrypts copy of Seed A and the formula with creator's public key, e.g., an ECC 521 public key;
6. Server encrypts and stores Seed A and the formula;
7. Server passes encrypted Seed A and the formula to client via SSL or, as shown in FIG. 1, TLS;
8. Creator decrypts Seed A and the formula using private key;
9. Creator generates Seed B on local device via a PRNG;
10. Creator uses the formula to combine Seed A and B to create Seed C, also known as the Data Seed;
11. Creator generates the payload;
12. Creator uses Seed A to generate AES Key 1;
13. Data Seed (C) is used to generate AES Key 2;
14. Creator uses AES Key 2 to encrypt payload;
15. Creator uses AES Key 1 to encrypt Seed B;
16. AES keys and seeds are destroyed by Creator;
17. Creator combines payload, encrypted Seed B and other data into one container;
18. Creator finishes registering the new secure container with the CCS; and
19. Container is ready for transport or storage, e.g. a cloud storage server.

As shown in FIG. 1, in flow 100 at process node 110 a data creator, also referred to as Client 1, desires to protect sensitive data and to create a secure container for it so it can be accessed by others that Client 1 desires to grant access to. Client 1 has credentials and generates public and private keys using, in the example shown in FIG. 1, ECC/521 cryptography. Alternatively, the public and private keys can be creased using RSA. Client 1 sends its public key to the Command and Control Server (CCS). Subsequently when Client 1 wishes to create a secure container, Client 1 establishes a secure session with the CCS and creates symmetric AES session keys using Client 1's public key before requesting permission to create a secure container. Communication between Client 1 and the CCS uses a secure process such as TLS/2048 over an internet connection to authenticate the user, validate the request, and generate Seed A. At process node 120, the CCS generates an encrypted Seed A that was encrypted with, e.g., the AES session key generated using the data creator's ECC 521 public key, and sends encrypted Seed A to Client 1 as shown at process node 122.

At process node 130, Client 1 receives Seed A and decrypts it using the AES session key. At process node 132, Client 1 uses the AES Key 1 to encrypt Seed B. At process node 140, Client 1 generates Seed B using a PRNG. At process node 142, Client 1 uses Seeds A and B to make Seed C according to the formula. At process node 146, Client 1 uses Seed C to generate a key, namely AES Key 2, and at process node 148, Client 1 uses AES Key 2 to encrypt the data payload, i.e. sensitive data it desires to protect.

At process node 150, Client 1 combines encrypted Seed B and the encrypted data payload, along with various metadata, to create the secure container. At process node 160, Client 1 destroys all AES keys and seeds and the formula after use, including all encrypted forms thereof. At process node 160, Client 1 finishes registering the new secure container with the CCS by sending the metadata to the CCS, encrypted using the AES session key. Finally at process node 170, Client 1 sends the secure container to a storage server, such as a cloud storage server as shown in FIG. 1, securely using TLS/2048.

Figure 2:
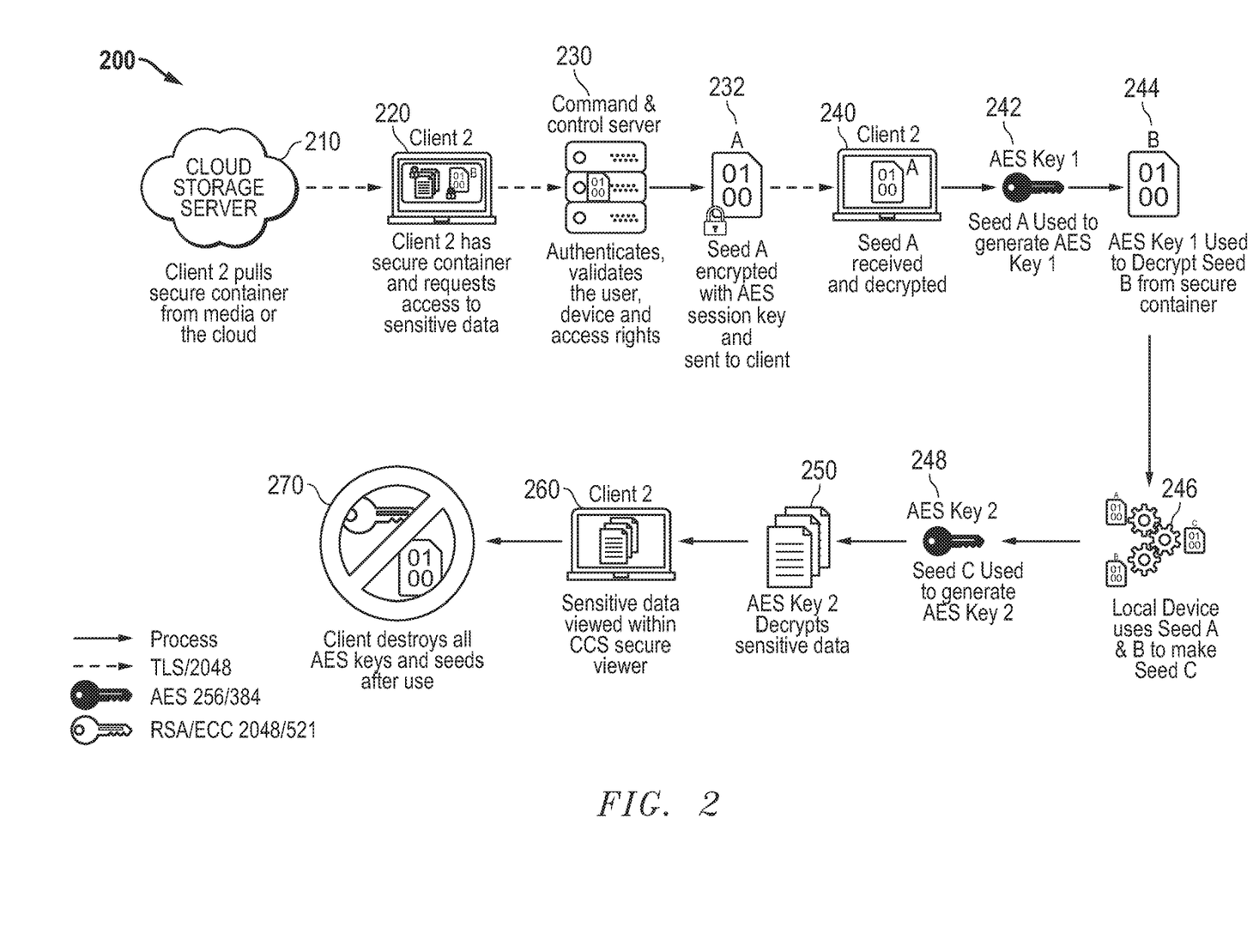
FIG. 2 shows a flow diagram that would be used by a data accessor according to the embodiments herein.

FIG. 2 shows a flow diagram 200 that would be used by a data accessor according to the embodiments herein. Using the TKST method, the data accessor, also referred to as Client 2, performs the following steps:

Data Accessor

1. Data accessor (hereinafter "accessor") has credentials, and generates public and private keys (RSA or ECC);
2. Accessor receives the secure container from the cloud or other media;
3. Accessor opens the secure container and begins the process of requesting access to encrypted data;
4. Accessor sends their public key and container metadata to CCS via an SSL or TLS connection;
5. Server authorizes the request, and retrieves Seed A and the formula for the container that needs to be opened;
6. Server encrypts Seed A and the formula using Accessor public key;
7. Server passes encrypted Seed A and the formula to Accessor via the SSL or TLS connection;
8. Accessor decrypts container using its private key;
9. Accessor uses Seed A to generate AES Key 1;
10. Accessor uses AES Key 1 to decrypt Seed B and the formula;
11. Accessor combines Seed A and B to create Seed C, using the formula provided by Server;
12. Accessor uses Seed C to generate AES key 2;
13. Accessor uses AES Key 2 to decrypt the payload, the payload being viewable, for example, by a local client secure viewer; and
14. Accessor destroys all Seeds and AES keys.

In flow diagram 200, at process node 210, a medium such as a cloud storage server as stores a secure container previously created and uploaded by a data creator as shown in FIG. 1. A data accessor, also referred to as Client 2, desires to access the data in the secure container. It establishes a secure session with the cloud storage server using TLS/2048 and the cloud storage server transfers the data securely using TLS session keys. At process node 220, Client 2 receives the secure container but is not yet able to decrypt it. It creates or has already created a public key-private key pair, and Client 2 sends a request to access it to the CCS along with its public key and the metadata from the secure container, again securely using at least one AES session key such as a TLS/2048 session key. At process node 230, the CCS authenticates the request, validates Client 2 as a user, and determines access rights. At process node 232, the CCS retrieves the Seed A and formula associated with the secure container, and encrypts it using the AES session key. At process node 240, Client 2 receives and decrypts Seed A and the formula using its corresponding AES session key. At process node 242, Client 2 generates a first key known as AES Key 1 from Seed A, and at process node 244 uses AES Key 1 to decrypt Seed B from the encrypted Seed B in the secure container. At process node 246, Client 1 combines Seeds A and B using the formula to create Seed C, the Data Seed. At process node 248, Client 2 uses Seed C to generate a second key known as AES Key 2. At process node 250, Client 2 uses AES Key 2 to decrypt the payload, i.e. the sensitive data that Client 1 wishes to protect but also to allow Client 2 access to. At process node 260, Client 2 has access to the sensitive data. In the example shown in FIG. 2, Client 2 has viewing rights but not printing or saving rights, so a secure viewer available to Client 2 allows Client 2 to view the sensitive data. At process node 270, Client 2 destroys all keys and seeds and the formula after use, including all encrypted forms thereof.

Using the TKST process, the CCS never receives a copy of Creator's sensitive data, only Seed A and the formula. When the CCS sends Seed A and the formula, it uses a secure communication protocol, such as one using symmetric AES session keys like TLS or SSL. Moreover, AES Key 1 and AES Key 2 only exist for a very short period of time, on the order of a few microseconds, and the clients at which they are created, either Client 1 or Client 2, can securely destroy them after use.

Details of an Exemplary TSKT System

Figure 3:
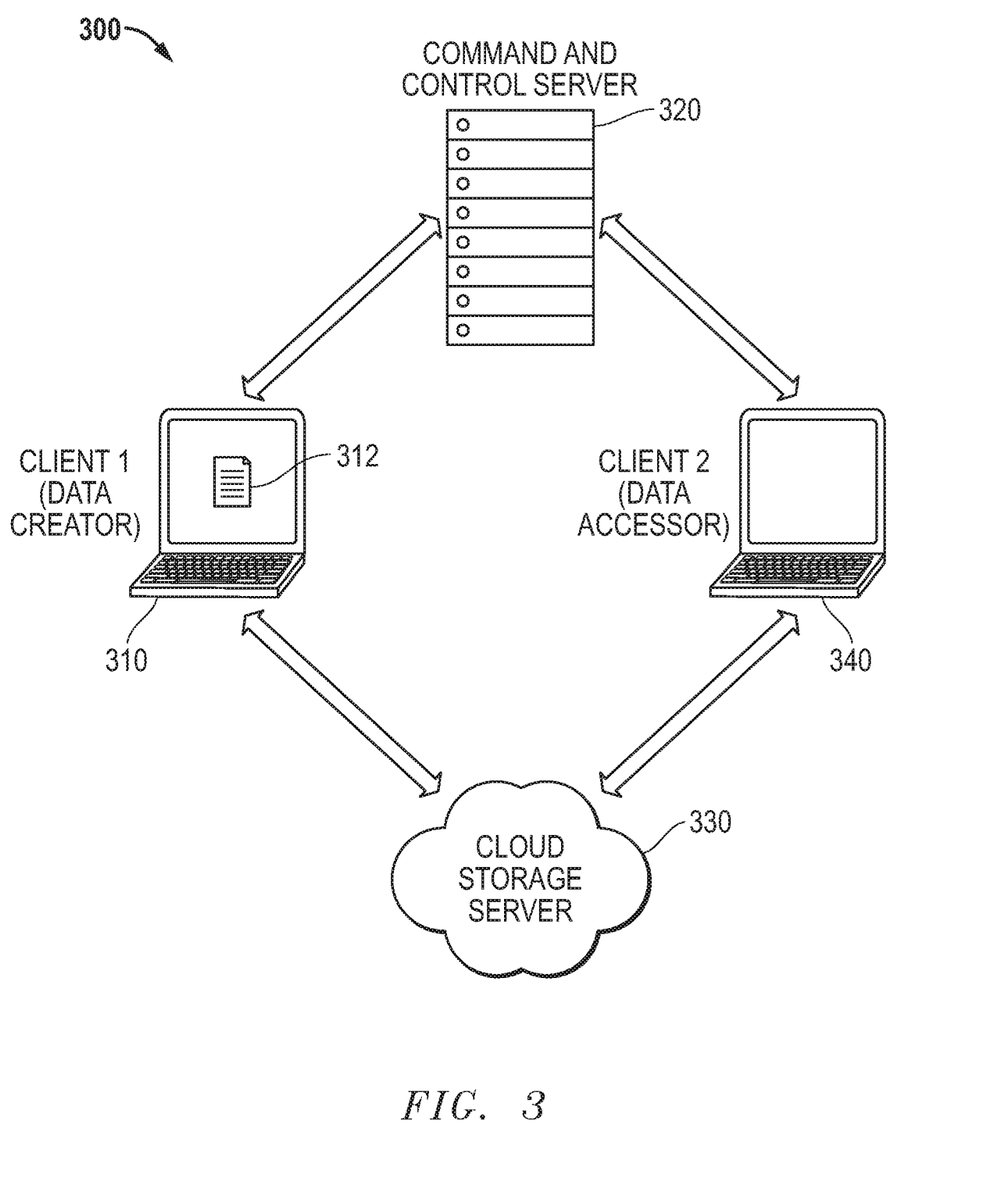
FIG. 3 illustrates a block diagram of a transient symmetric key technology (TSKT) system that can implement the TSKT flows of FIGS. 1 and 2 according to various embodiments described herein.

FIG. 3 illustrates a block diagram of a TSKT system 300 that can implement the TSKT flows of FIGS. 1 and 2 according to various embodiments described herein. As explained above, a TSKT system defines four roles: a data creator, a command and control server (CCS), a storage server, and a data accessor. In some embodiments, the same physical computer system can function as both the CCS and the storage server.

TSKT system 300 includes a client labeled "CLIENT 1" that functions as a data creator 310, a file server system that functions as a CCS 320, a cloud storage server, enterprise server, other file server system, or other storage medium that functions as a storage server 330, and a client labeled "CLIENT 2" that functions as a data accessor 340. Each of CLIENT 1 and CLIENT 2 can have associated with it, for example, a laptop computer, a desktop computer, a notebook computer, a personal digital assistant (PDA), a smartphone, and the like, and in general each of them can be any data processor or data processing system capable of creating digital file content that will be secured at a user's direction and perform the computations as described.

CLIENT 1 and CLIENT 2 communicate with other components including CCS 320 and storage server 330 using existing wired and/or wireless computer networks, and TSKT system 300 shows these communication paths as bidirectional arrows. Typically, these communications paths will be internet connections implementing secure forms of the TCP/IP protocol that use AES session keys (TLS or SSL) for security. In some embodiments, SSL session keys may be used in place of the TLS session keys.

Data creator 310 first creates a file 312 that he or she wishes to grant data accessor 340 access to. The file can be, for example, a word processing document, a plain text file, a spreadsheet file, a visual presentation file, an photograph, an audio recording, a video recording, and the like. The user associated with data creator 310 may wish to secure file 312 because it contains credit card credentials, user passwords, personal health information, confidential business information, company trade secrets, attorney work product or attorney-client privileged communications, or other sensitive data. File 312 is stored in memory of the computer associated with data accessor 310, and would be vulnerable to hacking or theft if sent over a public network such as the internet to data accessor 340, and may additionally be subject to hacking or theft if stored on either CCS 320 or storage server 330. TSKT system 300 assumes zero trust from computer networks and from organizations that operate CCS 320 and storage server 330.

Figure 4:
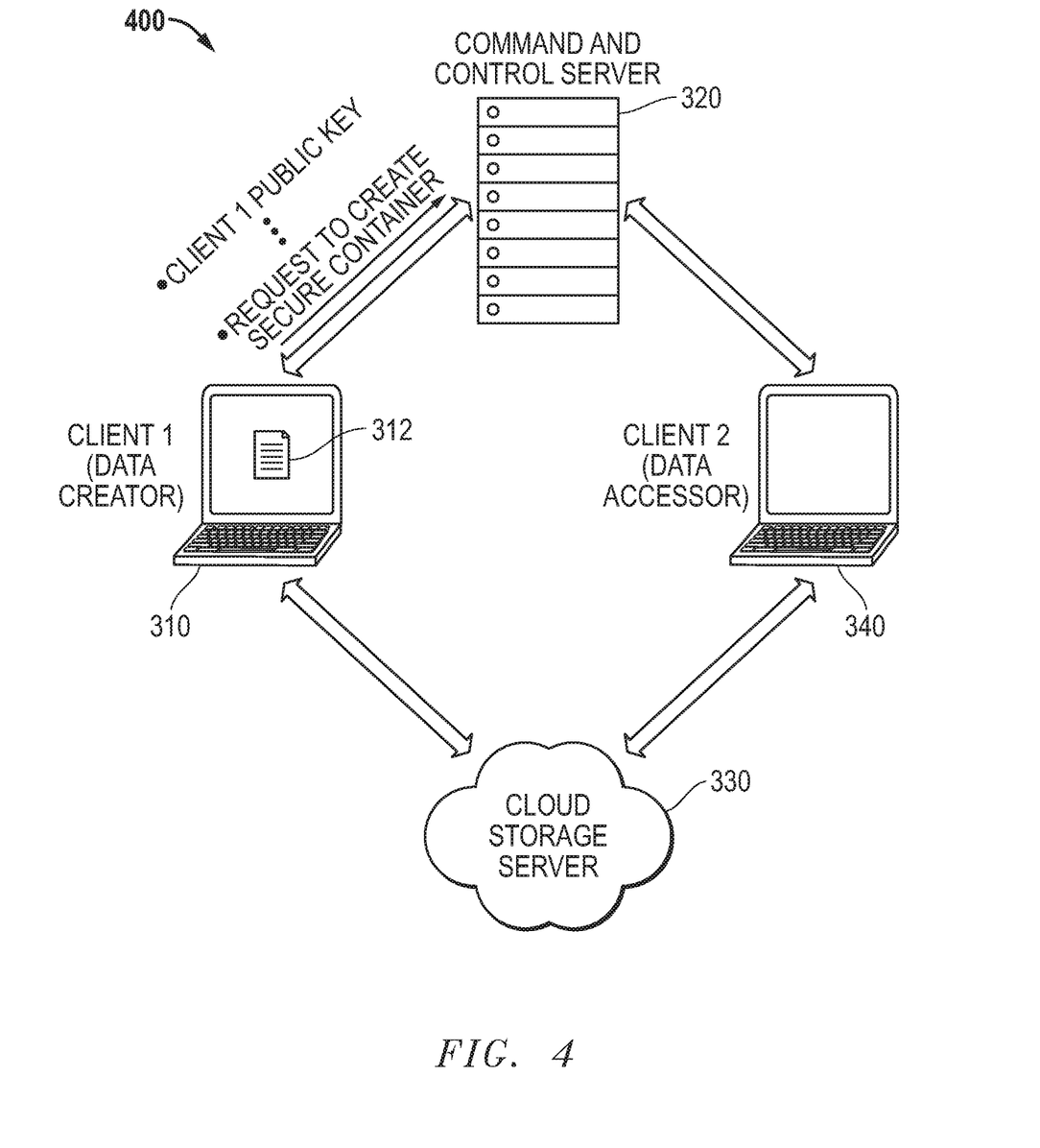
FIG. 4 illustrates a block diagram of the TSKT system of FIG. 3 when the data creator requests the creation of a secure container.

FIG. 4 illustrates a block diagram 400 of TSKT system 300 of FIG. 3 when data creator 310 requests the creation of a secure container. In order to request the secure container according to various embodiments described herein, data creator 310 first creates a public key-private key pair, and sends the public key to CCS 320, before requesting the creation of a secure container. For example, data creator 310 may send its public key to CCS 320 through an application running on the computer associated with it and at a time when client 310 registers the application with CCS 320.

Subsequently, data creator 310 desires to store data securely on storage server 330, or to send data to data accessor 340 using other means. At this point, data creator 310 sends a request to create a secure container to CCS 320. In some embodiments, the user creates the request using software resident on client 310's associated computer. In one example, the software can be a stand-alone program running under the associated computer's operating system. In another example, the software can be a plug-in, applet, or widget that is tightly coupled to another program, such as an EMAIL program. In an exemplary embodiment, the software displays a graphical user interface that allows the user to select options associated with the creation secure container. The software preferably interacts with CCS 320 in the background and in a way that is invisible to the user to create a better user experience.

Figure 5:
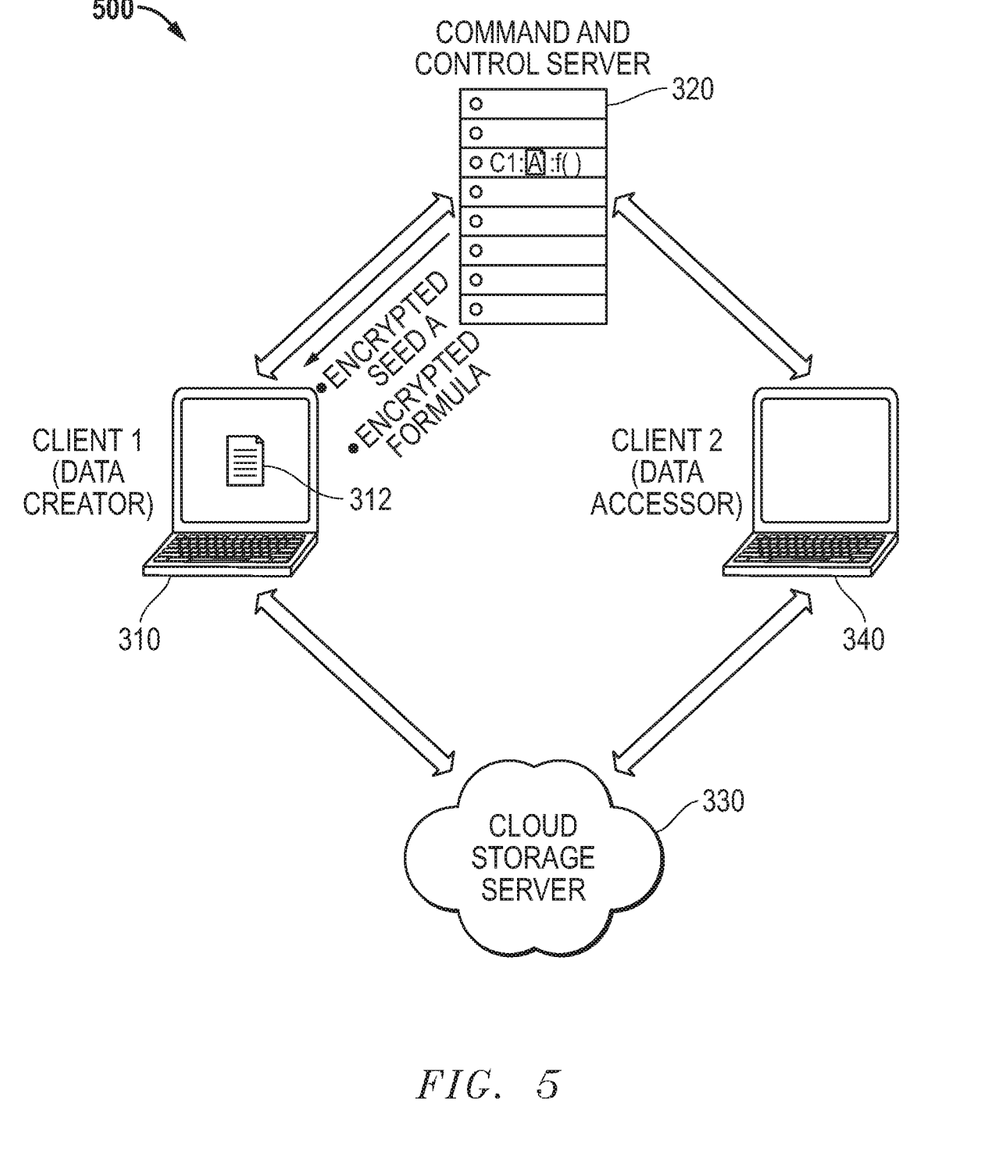
FIG. 5 illustrates a block diagram of the TSKT system of FIG. 3 showing the actions of the CCS in response to the request for the creation of the secure container.

FIG. 5 illustrates a block diagram 500 of TSKT system 300 of FIG. 3 showing the actions of CCS 320 in response to the request for the creation of the secure container. CCS 320 first creates a record in its database or file system associated with the secure container identifying the request as coming from data creator 310, using a tag labelled "C1". CCS 320 creates a Seed A (described above) and a randomly unique formula and associates them with the secure container request for the particular client in its database. CCS 320 then encrypts Seed A and the randomly unique formula using, e.g., an AES session key. Thus, the public-network communications containing the encrypted seed and the encrypted formula are themselves protected using conventional but very strong encryption techniques.

Figure 6:
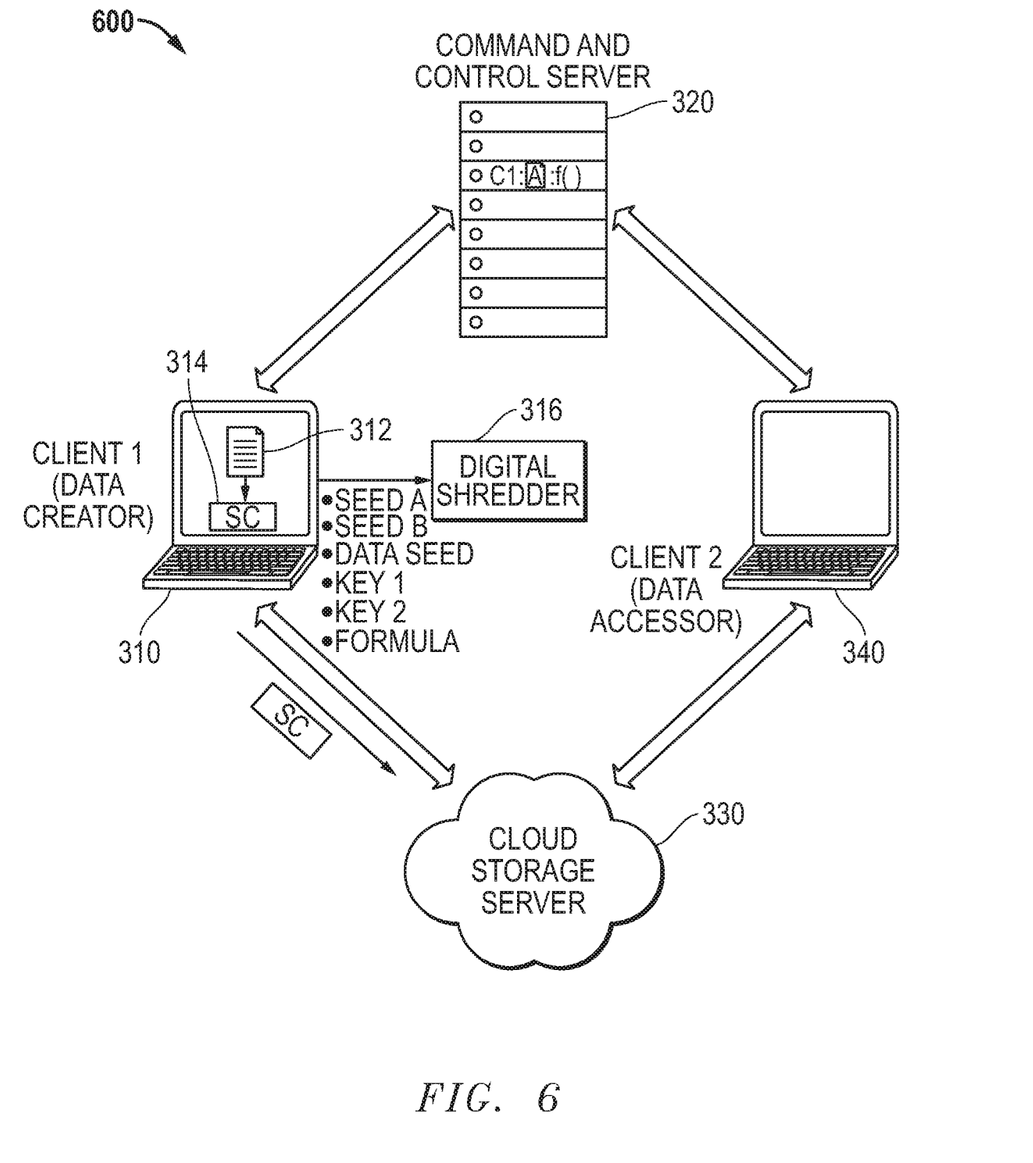
FIG. 6 illustrates a block diagram of the TSKT system of FIG. 3 showing the creation of the secure container.

FIG. 6 illustrates a block diagram 600 of TSKT system 300 of FIG. 3 showing the creation of a secure container 314 by the data creator 310, i.e. Client 1. As described above, after communicating with CCS 320 using TLS session keys, data creator 310 decrypts Seed A and the formula using its corresponding session key. Data creator 310 generates Seed B locally using a pseudo random number generator (PRNG). Data creator 310 then combines Seed A and Seed B using the decrypted formula to create Seed C, the Data Seed.

Data creator 310 also uses Seed A to generate AES Key 1, and encrypts Seed B using AES Key 1. Data creator 310 uses the Data Seed (Seed C) to generate AES Key 2, and encrypts the data payload, i.e. the file desired to be protected, using AES Key 2. Data creator 310 then combines encrypted Key 2 and encrypted Seed B with various metadata to form secure container 314, labelled "SC". The metadata includes various data rights management (DRM) indicators such as copy, printing, and/or saving privileges, biometrics that can uniquely identify the user of data creator 340 such as fingerprints, facial characteristics, and the like, geographic information of data creator 340 for geo-fencing access rights, a device identifier (Device ID), and access rights such as timelines that indicate when accesses are allowed or prohibited.

Shortly after use in creating secure container 314, data creator 310 destroys all keys and seeds and the formula. In this system, data creator 310 destroys both AES Key 1 and AES Key 2, as well as Seed A, Seed B, the Data Seed, and the formula, and any encrypted versions of them, using a digital shredder 316. A conventional file erase process of a personal computer operating system does not destroy or overwrite the data when the file is moved to the "recycle bin" or "trash", but merely deletes the file entry in the directory. Data of a recently deleted file may actually persist in computer memory for some time, making it subject to hacking and discovery. In addition, data that has been stored in a solid-state virtual memory drive, such as one based on floating-gate memory, may still be discoverable even after its nominal erasure, due to incomplete erasure or remaining charge profiles on the floating gates. To prevent these possibilities, data creator 310 uses digital shredder 316 to securely remove the data not only by removing its identification in the file directory, but also by overwriting the physical memory that the data was stored in sufficiently to prevent later discovery.

By creating Seed B using the PRNG with an adequate size, data creator 310 makes it practically impossible for a hacker to reproduce Seed B using random number generation. Moreover by allowing the seeds and keys to exist for only a brief period of time before they are digitally shredded, data creator 310 makes it difficult for a hacker that surreptitiously is able to access data creator 310's computer remotely, to understand the significance of the activity quickly enough to capture the necessary seeds, formula, and keys while they exist and therefore to decrypt secure container 314.

Figure 7:
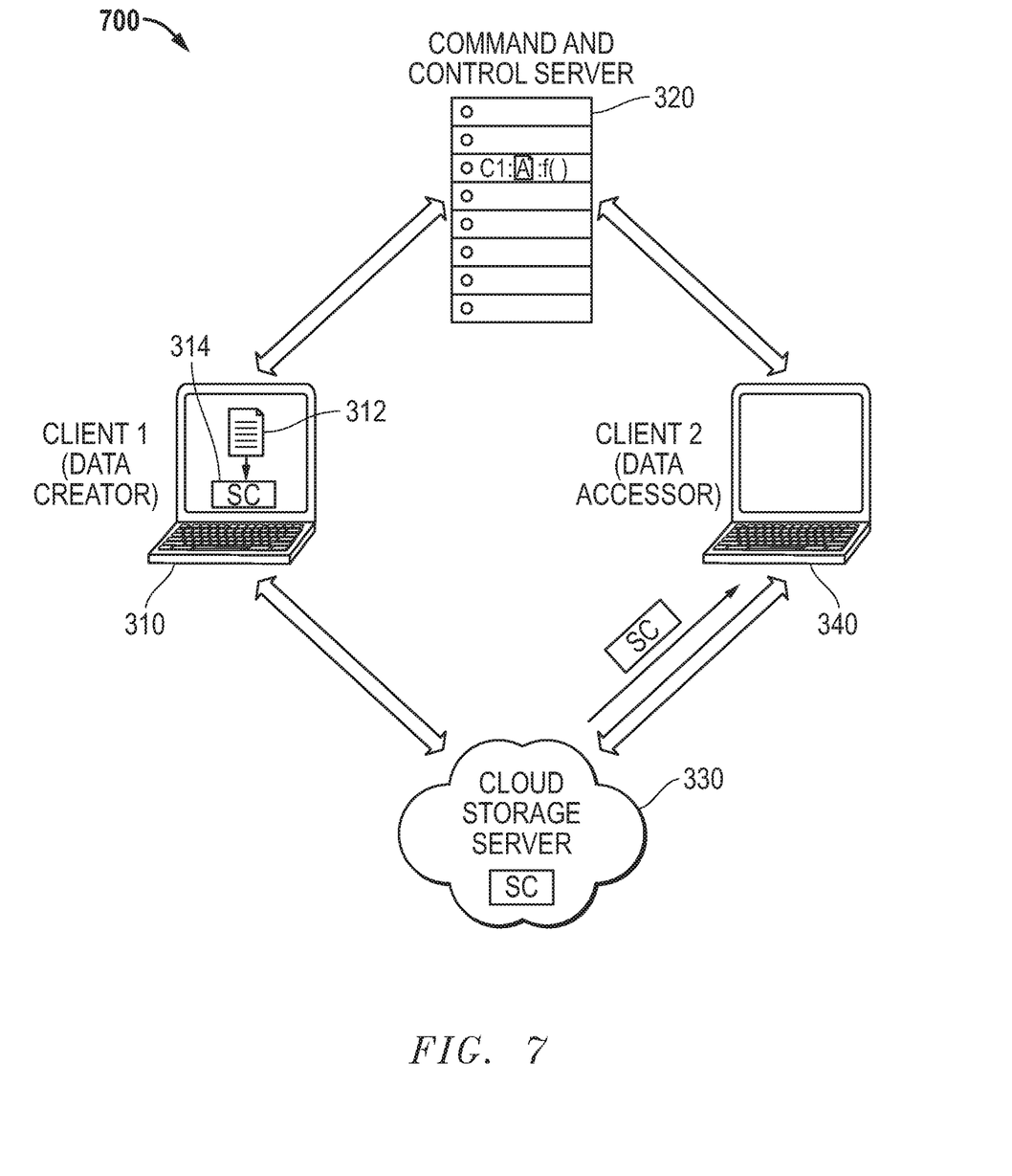
FIG. 7 illustrates a block diagram of the TSKT system of FIG. 3 showing of the retrieval of the secure container by an authorized data accessor.

FIG. 7 illustrates a block diagram 700 of TSKT system 300 of FIG. 3 showing of the retrieval of the secure container by an authorized data accessor. In this example, data accessor 340 is presumed to be an authorized data accessor. Data accessor 340 fetches the secure container from storage server 330. For example, the secure container may become visible in a shared file folder on storage server 330, and data accessor 340 accesses the file as it would access any other file under its operating system. For example, data accessor 340 accesses storage server 330 using the internet and the TLS protocol that creates secure session keys for the session. In another example, data creator 310 may send the secure container to data accessor 340 as an attachment to an electronic mail (EMAIL) message. In this case, the message is routed to data accessor 340's EMAIL server, and the message appears in the EMAIL Inbox of data accessor 340 from which it can be fetched. In yet another example, a user associated with data creator 310 transfers the secure file to the user associated with data accessor 340 using a portable medium such as a flash memory "thumb" drive that can be accessed by data accessor 340's computer.

Figure 8:
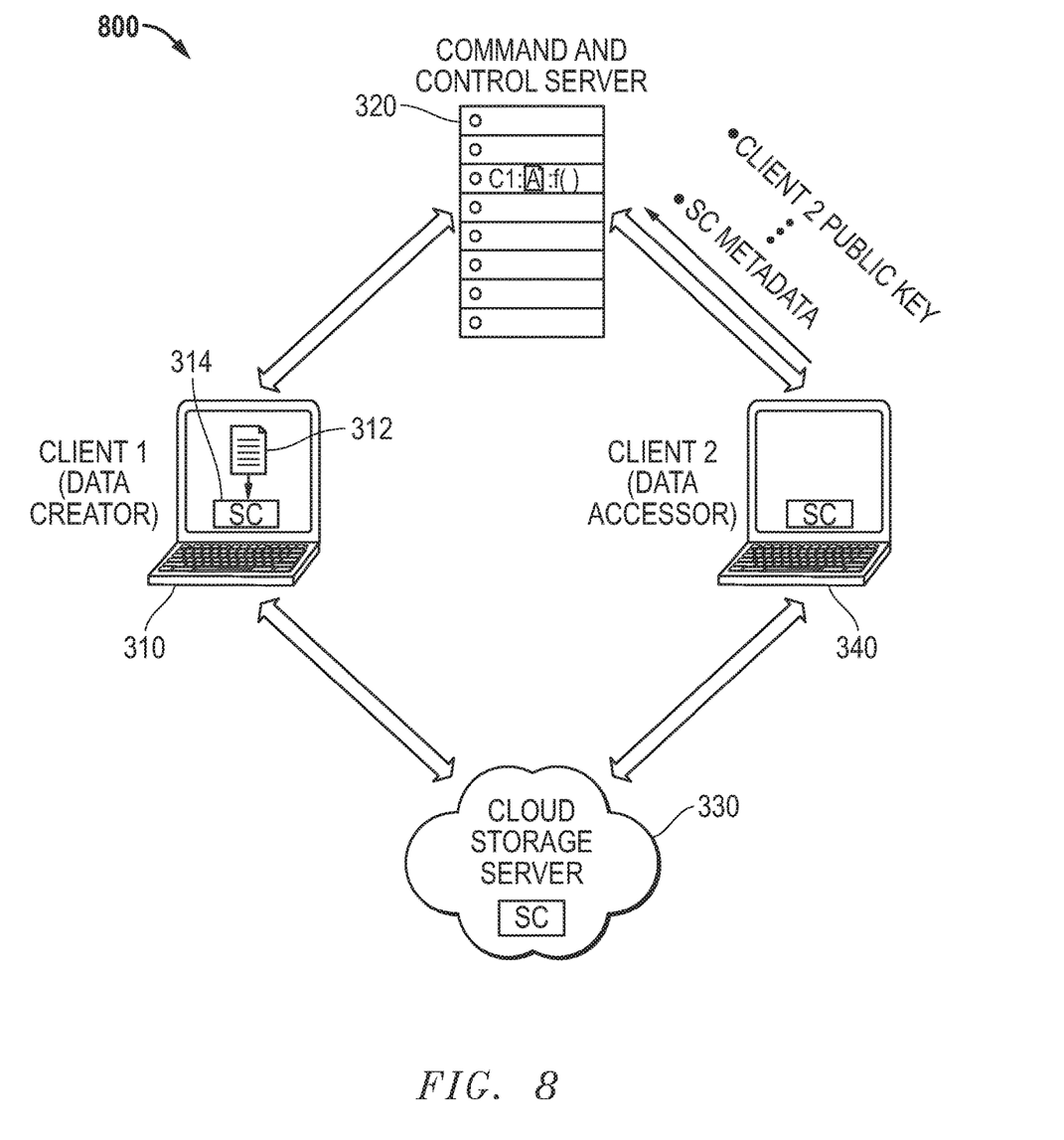
FIG. 8 illustrates a block diagram of the TSKT system of FIG. 3 showing a request by the authorized data accessor to decrypt the secure container.

FIG. 8 illustrates a block diagram 800 of TSKT system 300 of FIG. 3 showing a request by the authorized data accessor 340 to decrypt the secure container. As with data creator 310, data accessor 340 initially creates a public key/private key pair, and sends the public key to CCS 320. Later after receiving a secure container, data accessor 340 opens a secure session with CCS 320 using an SSL or TLS connection, and sends a secure request to CCS 320 to decrypt the secure container along with the SC metadata.

Figure 9:
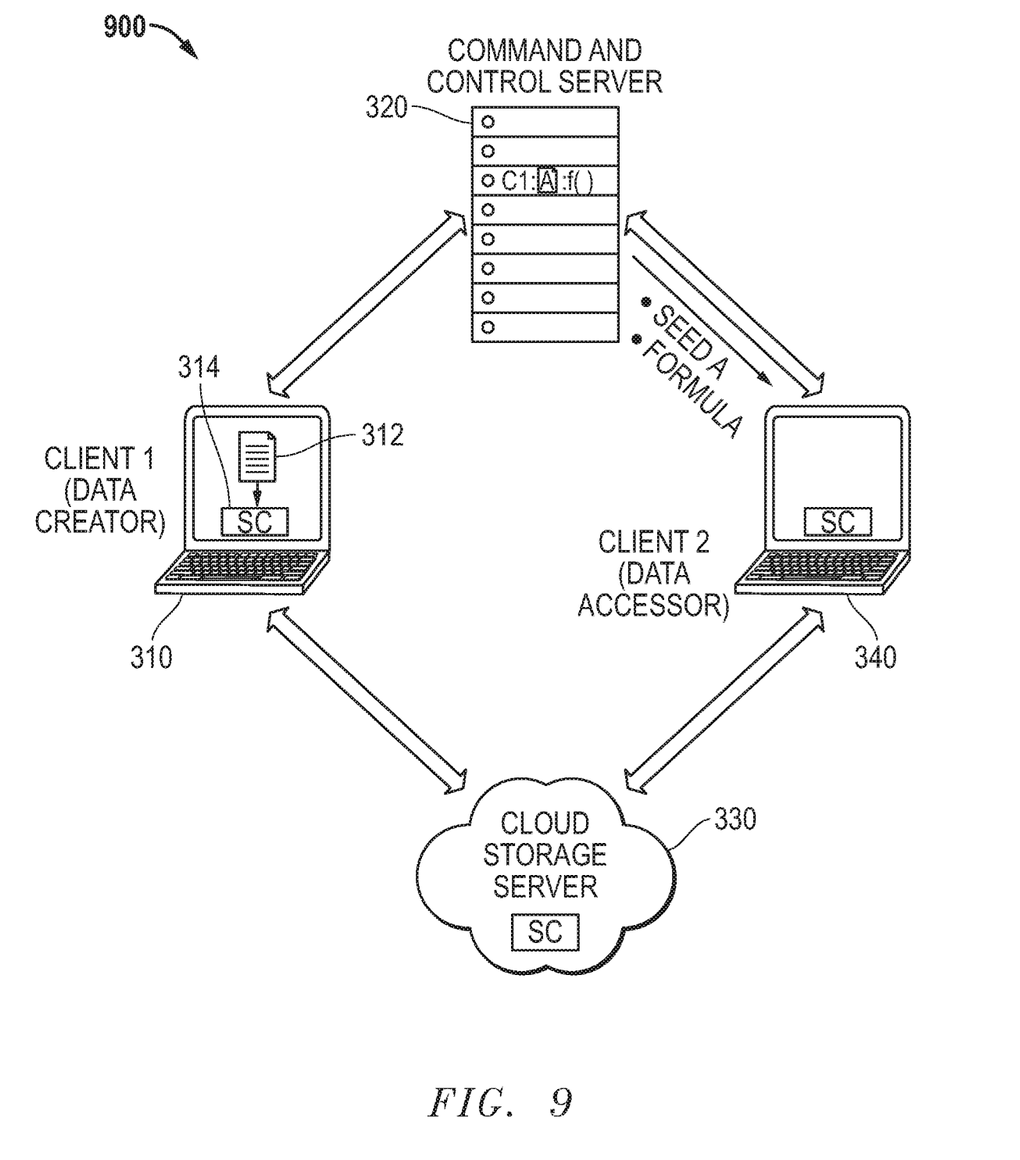
FIG. 9 illustrates a block diagram of the TSKT system of FIG. 3 when the CCS responds to the request for the retrieval of the secure container by the authorized data accessor.

FIG. 9 illustrates a block diagram 900 of TSKT system 300 of FIG. 3 showing the actions of CCS 320 in response to the request for the decryption of the secure container. The actions shown in block diagram 900 assume that CCS 320 authorizes the transmission based on the metadata in the secure container, i.e. that CCS 320 is able to identify client 340 as an authorized user using the biometrics, the computer associated with client 340 is allowed to access it based on its location according to the geo-fencing data, the allowed times for accessing the data are met, etc., for those metadata features that are enabled. Assuming all the metadata allows it, then CCS 320 encrypts Seed A using data accessor 340's public key, passes encrypted Seed A and the encrypted formula associated with the secure container to data accessor 340 using the secure session keys.

Figure 10:
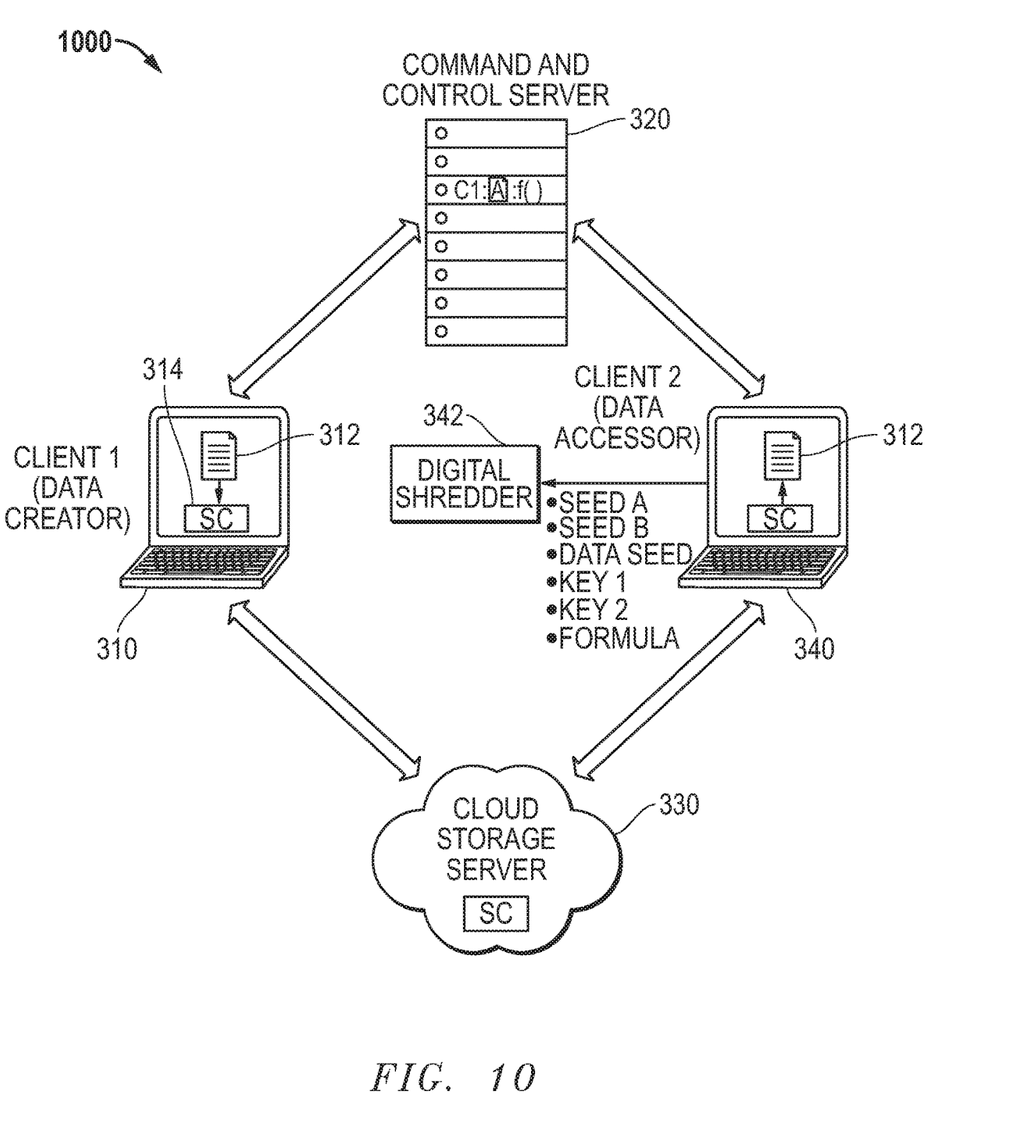
FIG. 10 illustrates a block diagram of the TSKT system of FIG. 3 when the data accessor decrypts the secure container.

FIG. 10 illustrates a block diagram of TSKT system 300 of FIG. 3 when data accessor 340 decrypts the secure container. As described above, data accessor 340 receives and decrypts the secure container using an AES session key. Data accessor 340 extracts the encrypted seed A and the encrypted formula and decrypts them using its corresponding AES session key. Data accessor 340 then uses Seed A to generate AES Key 1, and uses AES key 1 to decrypt seed B from the secure container. Data accessor 340 uses Seed A and Seed B and the formula to create Seed C, the data seed. Data accessor 340 uses Seed C to generate AES key 2, and uses AES key 2 to decrypt the payload, i.e. the data file. The data file is viewable using the secure software and may also be savable and/or printable based on the data rights management attributes set by data creator 310.

Shortly after use in creating the keys to decrypt encrypted Seed B and create AES keys 1 and 2, data accessor 340 destroys all keys and seeds and the formula including both AES Key 1 and AES Key 2, as well as Seed A, Seed B, the Data Seed, and the formula, and encrypted forms thereof, using a digital shredder 342. Digital shredder 342 preferably operates in the same general way as digital shredder 316 of FIG. 3 as described above to robustly destroy any indicia of the contents of the secure container or the keys and seeds created from it.

Thus, the TSKT system described herein provides an improvement in the operation of computer systems compared to known computer systems by placing the creation of encryption keys within the control of the party who owns the data. The TSKT system provides secure file creation and access by assuming zero trust on the part of any third-party actors, including CCS 320 and storage server 330. For example, even if storage server 330 is breached such that data creator 310's public key and a secure container are exposed, the secure container cannot be decrypted because storage server 330 is never in possession of any AES key capable of decrypting it. Thus, data creator 310 retains control over its data, which other systems will have access to it, and what kind of access the other systems will have. Because the keys and seeds that are used to create them are only in existence for a short period of time, it becomes extremely difficult or practically impossible to hack by third parties.

While various embodiments have been described, it should be apparent that various modifications may exist. For example, different protocols may be used during communications that transmit the secure container, including SSL, TLS, and the like. Moreover, the data creator may transfer the secure container to the data accessor in a variety of ways, such as through a storage server, directly through a portable storage medium, and the like. The storage server may take many forms, such as a cloud storage server, an enterprise server, and EMAIL server, and the like. Also various types of computer-based systems may be used for the data creator and the data accessor, including a laptop computer, a desktop computer, a notebook computer, a personal digital assistant (PDA), a smartphone, and the like. Also the communication links can be established using the internet, a local area network, a satellite link, and the like.

Accordingly, it is intended by the appended claims to cover all modifications of the invention that fall within the scope of the disclosed embodiments.

What is claimed is:

1. A method that, in response to a user's direction, causes a data creator to securely send a data payload to another device in a transient symmetric key technology (TSKT) system, comprising:
  receiving an encrypted first seed and an encrypted formula from a command and control server, in response to the command and control server authenticating the data creator to create a secure container;
  generating a second seed;
  decrypting said encrypted first seed and said encrypted formula in response to said receiving;
  combining said first seed and said second seed using said formula to create a data seed;
  generating a first key using said first seed to form an encrypted second seed;
  encrypting said second seed using said first key;
  generating a second key using said data seed;
  encrypting the data payload using said second key to form an encrypted data payload; and
  combining said encrypted data payload and said encrypted second seed in said secure container, and subsequently destroying all keys and seeds and said formula.

2. The method of claim 1, further comprising: sending a request to create said secure container to said command and control server prior to said receiving said encrypted first seed and said encrypted formula from said command and control server.

3. The method of claim 1, further comprising:
  communicating with said command and control server using a secure communication protocol.

4. The method of claim 3, wherein said communicating comprises:
  generating a public key and a private key;
  sending said public key to said command and control server; and
  communicating with said command and control server using symmetric key cryptography with at least one session key generated using said public key.

5. The method of claim 1, wherein said formula is characterized as being randomly unique and wherein said generating said second seed comprises:
  generating said second seed using a pseudo random number generator (PRNG).

6. The method of claim 1, wherein said data creator generates said first and second keys using an Advanced Encryption Standard (AES) encryption algorithm.

7. The method of claim 1, wherein said destroying said first seed, said second seed, said data seed, said first key, and said second key comprises:
  overwriting values of said first seed, said second seed, said data seed, said first key, and said second key in memory associated with said data creator.

8. The method of claim 1, wherein said combining said data payload and said second seed in said secure container comprises:
  combining metadata with said encrypted data payload and said encrypted second seed in said secure container.

9. The method of claim 8, wherein said metadata comprises data rights management information associated with said secure container.

10. The method of claim 8, wherein said metadata comprises biometrics information about an individual that controls the data creator.

11. The method of claim 8, wherein said metadata comprises geolocation data associated with the data creator.

12. A method that, in response to a user's direction, causes a data accessor to securely decrypt a data payload from another device in a transient symmetric key technology (TSKT) system, comprising:
  receiving and opening a secure container from the other device;
  extracting an encrypted second seed and an encrypted data payload from the secure container;
  receiving an encrypted first seed and an encrypted formula from a command and control server in response to the command and control server authorizing the data accessor to decrypt the data payload;
  decrypting said encrypted first seed and said encrypted formula to create a first seed and a formula;
  using said first seed to generate a first key;
  using said first key to decrypt said encrypted second seed to form a second seed;
  combining said first seed and said second seed using said formula to create a data seed;
  using said data seed to generate a second key; and
  decrypting said encrypted data payload using said second key to obtain the data payload, and subsequently destroying all keys and seeds and said formula.

13. The method of claim 12, further comprising:
  generating a public key and a private key;
  sending said public key to a command and control server; and
  communicating between said data accessor and said command and control server using symmetric key cryptography with at least one session key generated using said public key.

14. The method of claim 12, wherein the other device comprises a cloud storage server.

15. The method of claim 12, wherein the other device comprises a portable storage medium.

16. A method for operating a command and control server to implement a transient symmetric key technology (TSKT) system, comprising:
  in response to a first request to create a secure container from a data creator:
  authenticating said first request;
  generating a first seed and a formula in response to said authenticating;
  first encrypting said first seed and said formula to provide a first encrypted first seed and a first encrypted formula; and
  sending said first encrypted first seed and said first encrypted formula to said data creator, wherein said data creator:
decrypts said first encrypted first seed and said first encrypted formula, generates a second seed not based on either said first seed or said formula, and combines an encrypted data payload encrypted based on said first seed, said second seed, and said formula, and an encrypted second seed encrypted based on said first seed, into said secure container; and
in response to a second request that is subsequent to the first request to access data in said secure container from a data accessor:
authorizing said second request;
retrieving said first seed and said formula in response to said authorizing;
second encrypting said first seed and said formula associated with said secure container to form a second encrypted first seed and a second encrypted formula; and
sending said second encrypted first seed and said second encrypted formula to said data accessor in response to said second encrypting,
wherein said data accessor: decrypts said second encrypted first seed and said second encrypted formula, decrypts said encrypted second seed from said secure container based on said first seed, and decrypts said encrypted data payload from said secure container based on said first seed, said second seed, and said formula.

17. The method of claim 16, wherein said formula is characterized as being randomly unique, and said generating said seed comprises generating said seed using a pseudo random number generator (PRNG).

18. The method of claim 16, further comprising:
receiving a first public key from said data creator; and
subsequently communicating between said command and control server and said data creator using symmetric key cryptography with at least one session key generated using said first public key.

19. The method of claim 18, wherein said communicating comprises:
receiving a second public key from said data accessor; and
communicating between said command and control server and said data accessor using symmetric key cryptography with at least one session key generated using said second public key.

20. A transient symmetric key technology (TSKT) system, comprising: a data creator comprising a first computer; and a command and control server comprising a second computer and coupled to the data creator, wherein:
in response to user input, said data creator sends a request to said command and control server to create a secure container for secure transmission and storage of a data payload,
said command and control server is configured to:
authenticate said request,
generate a first seed and a formula in response to authenticating said request,
encrypt said first seed and said formula to provide an encrypted first seed and an encrypted formula, and
send said encrypted first seed and said encrypted formula to said data creator in response to the command and control server authenticating the data creator to create said secure container, and
said data creator is configured to:
decrypt said encrypted first seed and said encrypted formula, generate a second seed,
combine said first seed and said second seed using said formula to create a data seed,
generate a first key using said first seed,
encrypt said second seed using said first key to produce an encrypted second seed,
generate a second key using said data seed,
encrypt said data payload using said second key,
combine said data payload and said encrypted second seed in said secure container, and
subsequently destroy all keys and seeds and said formula.

21. The TSKT system of claim 20, further comprising:
a storage server coupled to said data creator for receiving and storing said secure container.

22. The TSKT system of claim 21, wherein:
said storage server comprises a cloud storage server.

23. The TSKT system of claim 21, wherein said command and control server and said storage server are implemented using a common computer system.

24. The TSKT system of claim 21, wherein said command and control server and said storage server are implemented using separate computer systems.

25. The TSKT system of claim 21, further comprising: a data accessor comprising a third computer coupled to said storage server, wherein said data accessor generates a public key and a second private key, sends said public key to said command and control server, subsequently receives and opens said secure container from said storage server, sends a request to access said secure container and secure container metadata to said command and control server.

26. The TSKT system of claim 25, wherein: said command and control server selectively authorizes said request from the data accessor to access said secure container based on said secure container metadata, retrieves said first seed and said formula for said secure container, encrypts said first seed and said formula using symmetric key cryptography with at least one session key generated with said public key, and sends an encrypted first seed and an encrypted formula to said data accessor.

27. The TSKT system of claim 26, wherein:
said data accessor receives and decrypts said encrypted first seed and said encrypted formula using said at least one session key, uses said first seed to generate said first key, uses said first key to decrypt said encrypted second seed, combines said first seed and said second seed using said formula to provide said data seed, uses said data seed to decrypt a payload, and subsequently destroys all keys and seeds and said formula.

* * * * *